United States Patent [19]

Allen

[11] 4,417,102

[45] Nov. 22, 1983

[54] NOISE AND BIT RATE REDUCTION ARRANGEMENTS

[75] Inventor: Jonathan B. Allen, Westfield, N.J.

[73] Assignee: Bell Telephone Laboratories, Incorporated, Murray Hill, N.J.

[21] Appl. No.: 270,542

[22] Filed: Jun. 4, 1981

[51] Int. Cl.³ .............................................. G10L 1/00
[52] U.S. Cl. .................................. 364/513; 364/900
[58] Field of Search ............... 179/15.55 R, 15.55 T, 179/1.5 A; 364/513; 371/81

[56] References Cited

U.S. PATENT DOCUMENTS

| 3,341,659 | 9/1967 | Stern | 179/1.5 |
|---|---|---|---|
| 3,448,216 | 6/1969 | Kelley | 179/15.55 R |
| 3,742,395 | 6/1973 | Yoneyama | 179/15.55 R |
| 4,058,676 | 10/1977 | Wilkes | 179/1.5 A |
| 4,142,071 | 2/1979 | Croisier et al. | 179/15.55 R |
| 4,216,354 | 8/1980 | Esteban et al. | 179/15.55 R |
| 4,227,046 | 10/1980 | Nakajima et al. | 179/1.5 D |
| 4,229,622 | 10/1980 | Cochrane | 370/81 |

Primary Examiner—Emanuel S. Kemeny
Attorney, Agent, or Firm—Kurt C. Olsen; Jack S. Cubert

[57] ABSTRACT

Improved digital encoding of an input speech signal for transmission uses an adaptive low-pass filter and adaptive coder responsive to the total spectral energy of the input signal, thereby providing reduced coder bit rate at constant coder noise, or conversely reduced coder noise at constant bit rate.

18 Claims, 2 Drawing Figures

NOISE AND BIT RATE REDUCTION ARRANGEMENTS

CROSS-REFERENCE TO RELATED APPLICATIONS

Filed concurrently with and related to the present application is application Ser. No. 270,543 by J. B. Allen.

BACKGROUND OF THE INVENTION

This invention relates to digital signal processing and more particularly to arrangements for reducing coder noise and bit rate.

A digital signal is typically defined as a signal which may exist as either of two possible discrete values or states. The value or state of a digital signal may physically correspond to, for example, the presence or absence of a fixed voltage. It is usually more convenient, however, to omit reference to physical conditions and to describe the value or state of a digital signal as being equal to either 0 or 1. The numbers 0 and 1 are called binary digits or bits.

A digital communication or storage system is designed to convey or store information that is expressed in the form of digital signals. In order to convey or store an analog signal such as speech, it is necessary to convert the analog signal into digital form. Analog to digital conversion may be accomplished by a device known categorically as a coder. Digital signals are converted back into a replica of the original analog signal by a decoder.

A basic technique for converting analog signals into digital signals is known as pulse code modulation (PCM). In a PCM coder, an analog signal is sampled at a succession of time intervals. The sampling rate, that is, the number of samples taken in a given amount of time, must be equal to or greater than twice the maximum significant frequency of the analog signal. Each sample is coded, that is, assigned a digital representation according to its amplitude. The digital representation of a sample, called a binary coded word, comprises a pattern of bits. The number of bits in a word determines the number of distinct or different words available for coding the sample amplitudes. If words are defined as having one bit, for example, there are two possible distinct words: 0 and 1. If words have two bits, there are four possible words: 00, 01, 10 and 11. There may be, for example, 8 to 13 bits per word in an actual PCM representation.

The amplitude of a sample, on the other hand, may assume any one of a virtually infinite number of values. Since it would be impractical to assign a distinct binary coded word for every possible value of the sample amplitude, a process known as quantization is necessary. In quantization, the range of expected sample amplitudes is divided up into a finite number of discrete amplitude values. Each discrete amplitude value corresponds to a different binary coded word, the total number of discrete amplitude values being equal to the number of possible binary coded words. For a given sample amplitude, the nearest discrete amplitude value is selected. The binary coded word which corresponds to the selected discrete amplitude value is the digital representation of the sample amplitude. A sampled analog signal is thereby said to be quantized and coded.

Since the quantization process only approximately represents the original analog signal, distortion or coder noise is introduced. The noise may be reduced by increasing the number of bits used to quantize each sample. Increasing the number of bits per sample also increases the bit rate of the coder, the coder bit rate being defined as the product of the sampling rate and the number of bits per sample. An increased coder bit rate, however, commands an increased share of the available capacity of a digital communication system.

Reduced coder noise and bit rate can be achieved with a variety of more complex quantization techniques. The techniques generally exploit the fact that adjacent samples of speech are very similar to one another. Adaptive data modulation (ADM) and adaptive differential pulse code modulation (ADPCM), for example, are well known refinements of the basic PCM scheme of sampling, quantization and coding.

It is an object of the invention to provide reduced coder bit rate at a given level of noise or conversely to provide reduced coder noise at a given bit rate. It is another object to provide an adaptive sampling rate coder whereby the average bit rate of the coder is reduced.

SUMMARY OF THE INVENTION

I have discovered that the quality of digitally coded speech is improved by assuming a time variable model of speech bandwidth instead of the time invariant model of the prior art. The time varying bandwidth of input speech is used to reject noise components which occur at frequencies outside of the principal speech spectrum.

The invention is directed to arrangements for reducing bandwidth in a digital signal processing system. Signals are generated representative of the spectral energy of an input signal. In one embodiment, a portion of the input signal spectrum is removed responsive to the spectral energy signals to form a modified input signal. A replica signal is formed responsive to the modified input signal. According to one aspect of the invention, the sampling rate of a coder is altered responsive to the spectral energy signals. A portion of the replica signal spectrum is removed responsive to the spectral energy signals to form a modified replica signal.

DETAILED DESCRIPTION

Figure 1:
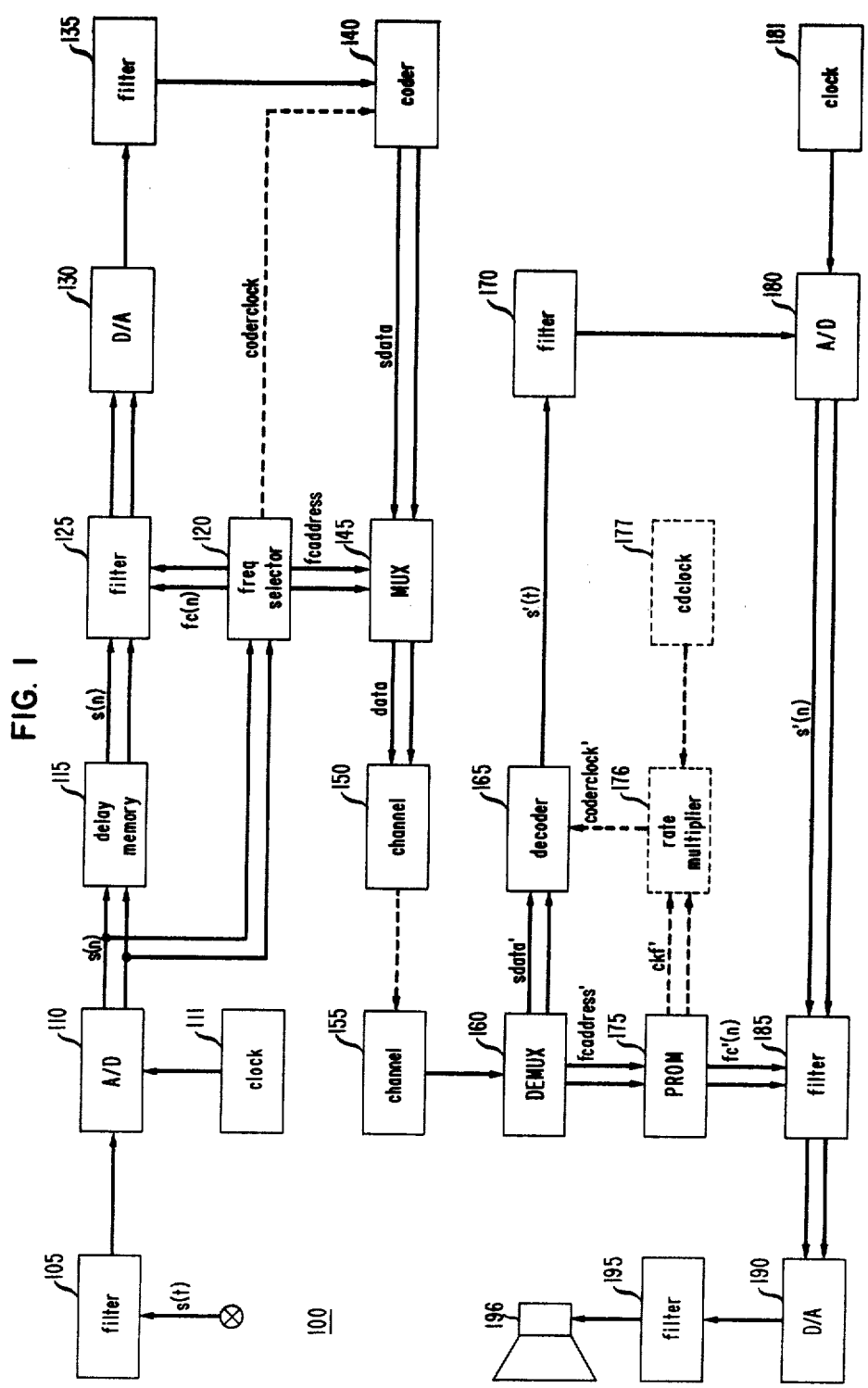
FIG. 1 shows a general block diagram of a digital signal processing system illustrative of the invention.

FIG. 1 shows a general block diagram of a digital signal processing system 100 incorporating noise and bit rate reduction arrangements illustrative of the invention. The noise and bit rate reduction arrangements in system 100 may alternatively comprise a general purpose computer, for example, adapted to perform the signal processing functions described with respect to FIG. 1 in conjunction with a read-only memory (ROM).

A speech signal s(t) is input to filter 105. Filter 105 may be, for example, a bandpass filter operative to remove frequencies below 200 Hz and above 3200 Hz. The output of filter 105 is applied to the input of A/D (analog-to-digital) converter 110. Converter 110 may comprise, for example, SHM-IC-1A and ADC-HX12-BMC circuits made by Datel, Incorporated. The sampling rate of converter 110 is determined by clock 111.

Clock 111 may operate at, for example, 8 KHz. The output of A/D converter 110 is a 12 bit, for example, digital representation s(n) of the amplitude of input speech signal s(t). The parenthetical n of digital input signal of s(n) is an index which specifies a particular sample of the input speech signal s(t).

Digital input signals s(n) from converter 110 are applied to delay memory 115. Delay memory 115 may be, for example, a first-in first-out memory such as the AM 6812 circuit made by Advanced Micro Devices, Incorporated. In delay memory 115, digital signals s(n) are delayed for a specified number of samples. The delay corresponds to the number of samples which comprises a frame. A frame is defined as, for example, 256 consecutive samples. The delay is necessary to allow for processing in frequency selector 120, as described below.

Digital signals s(n) from converter 110 are also applied to frequency selector 120. For each frame, the frequency above which a fixed proportion of the speech signal spectral energy lies is selected. The proportion may be, for example, 1 percent of the total spectral energy of the frame. The selected frequency, called the cutoff frequency signal fc(n), is applied to control the filter 125. An address signal FCADDRESS representative of the cutoff frequency is applied to multiplexer 145.

Figure 2:
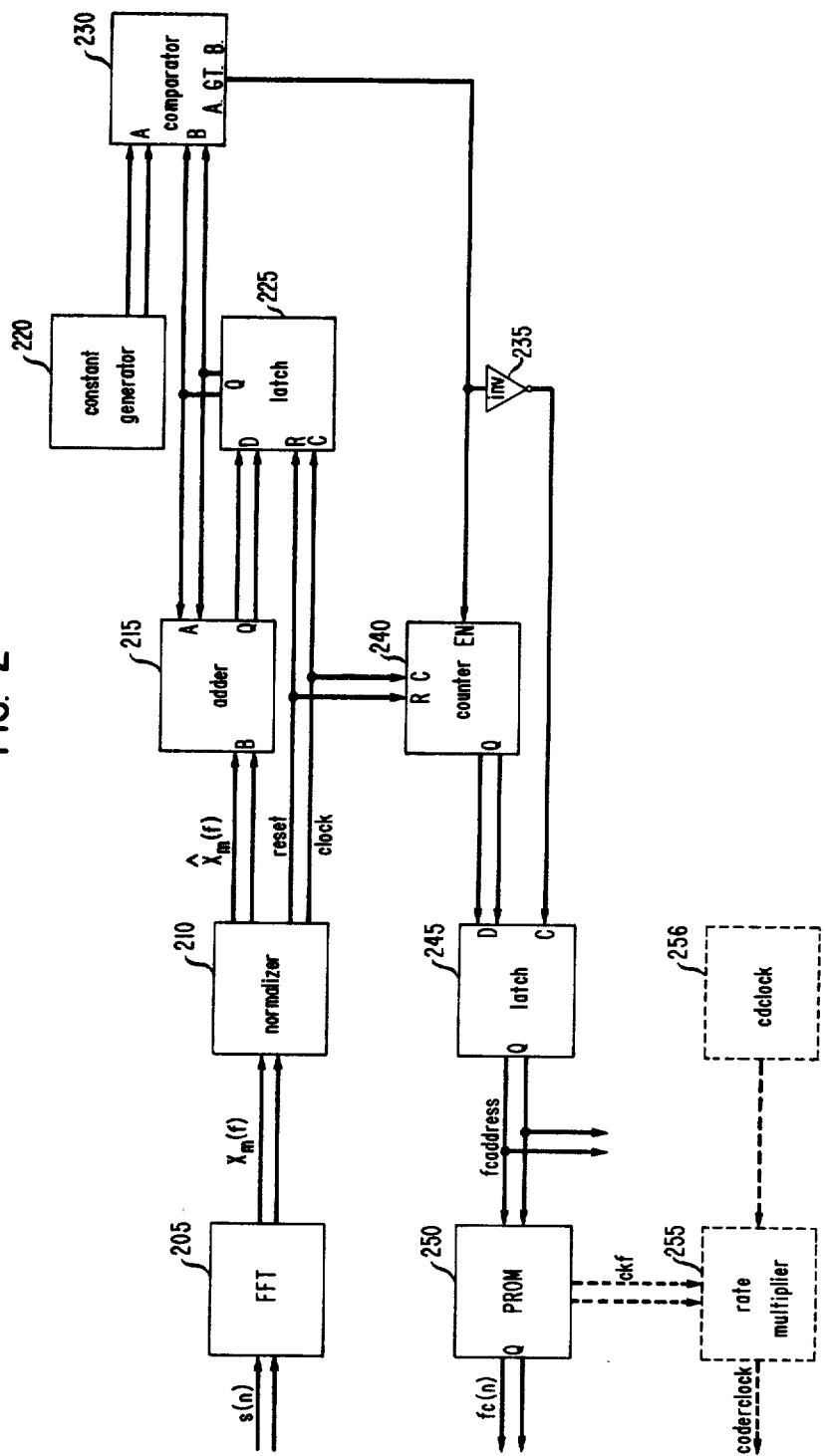
FIG. 2 shows a detailed block diagram of a frequency selector useful in the system of FIG. 1.

Referring to a detailed diagram of frequency selector 120 in FIG. 2, digital signals s(n) are input to Discrete Fourier Transform (DFT) processor 205. Processor 205 is preferably a Fast Fourier Transform (FFT) device; other DFT arrangements may be substituted, as is well known in the art. Processor 205 may comprise, for example, a type TDC 1009J circuit made by TRW, Incorporated. A further description of FFT processors may be found in the paper by R. J. Karkowski entitled "An Introduction to Digital Spectrum Analysis including a High Speed FFT Processor Design", *LSI Publication* TP10-1/80, TRW LSI Products, El Segundo, California.

In processor 205, a 512 point FFT, for example, is obtained for each frame of 256 samples. Frames may be overlapped by three quarters, that is, shifted by one quarter frame or 64 samples. A Hamming window is preferably applied to each frame prior to the FFT; other windowing arrangements such as Chebyshev or Kaiser, may be substituted as is well known in the art. The output of FFT processor 205 is the energy spectrum $X_m(f)$ of each frame, where m is the index which specifies the frame and f is the index which specifies a spectral line in a given frame. Index m is equal to the integer part of the quotient of the sample index n divided by the sample shift; in the preceding example, m changes once every 64 samples. The range of m may be given as m=0, 1, 2 ..., where m has no upper limit for continuous operation of system 100. The range of f may be given as f=0, 1, 2 ... F, where 0 corresponds to the highest frequency spectral line and F corresponds to the lowest frequency spectral line. In the preceding example, there are 256 spectral lines and F is thus equal to 255.

The energy spectrum $X_m(f)$ of each frame is applied to normalizer 210. In normalizer 210, each spectral line f is converted to a percentage of the total energy in the corresponding frame:

$$X_m(f) = \frac{|X_m(f)|^2}{\sum_{f=0}^{F} |X_m(f)|^2} \quad m = 0, 1, 2 \ldots; f = 0, 1, 2 \ldots, F$$

For each frame m, normalizer 210 outputs signal RESET. Similarly, for each frame f, normalizer 210 outputs signal CLOCK. Normalizer 210 is a microprocessor arrangement such as described in the *Microprocessor Systems Reference*, published by Data General Corporation, 1979, or other microprocessor systems well known in the art. The microprocessor is operated in accordance with instruction codes stored in a read-only memory (ROM). The instruction codes are listed in FORTRAN language form in Table 1.

Latch 225 and counter 240 are reset to zero by signal RESET from normalizer 210. On the rising edge of each signal CLOCK from normalizer 210, latch 225 accepts data at input D. Signal CLOCK is also applied to increment counter 240 when the counter is enabled by a true signal from the A>B output of comparator 230.

Signals $X_m(f)$ from normalizer 210 are applied to the B input of adder 215. The Q output of adder 215 is connected to the D input of latch 225. The Q output of latch 225 is connected to the A input of adder 215. Adder 215 and latch 225 are thereby arranged to sum signals $X_m(f)$ for f=0, 1, 2 ... F in synchrony with signal CLOCK from normalizer 210.

The accumulated sum of signals $X_m(f)$ from latch 225 is also applied to the B input of comparator 230. The A input of comparator 230 is connected to constant generator 220. Constant generator 220 outputs a digital signal which corresponds to the fixed proportion of the speech signal spectral energy, namely, in the present example, 1 percent. Generator 220 may be, for example, a binary switch appropriately connected to a resistor network between a constant voltage source and ground. The switch may then be set to a voltage value corresponding to the binary number representation of the fixed proportion of spectral energy.

If the accumulated sum in latch 225 is less than the constant value from generator 220, the A>B output of comparator 230 is true. Counter 240 thereby remains enabled and continues to count summations in adder 215. When the accumulated sum in latch 225 becomes equal to or greater than the constant value from generator 220, the A>B output of comparator 230 becomes false. Counter 240 is thereby disabled. When the A>B output of comparator 230 is false, inverter 235 outputs a true signal to the clock input of latch 245. Latch 245 thereby stores the current output of counter 240. Signal FCADDRESS from latch 245 is applied to the address terminals of PROM 250. From the memory location given by signal FCADDRESS, PROM 250 outputs a corresponding cutoff frequency signal fc(n). Cutoff frequency signal fc(n) is equal to the frequency in the spectrum of a given frame above which the fixed proportion (e.g., 1 percent) of the total spectrum energy lies. It may be seen, in reference to the previous example in which frames overlap by one-quarter, that the value of signal fc(n) may change once for every 64 samples n.

Referring to FIG. 1, cutoff frequency signal fc(n) from frequency selector 120 is applied to filter 125. Filter 125 may comprise, for example, a variable digital filter. The variable filter may be adapted by techniques well known in the art to establish a cutoff frequency responsive to cutoff frequency signal fc(n). A particular portion of the spectrum of digital input signals s(n) is thereby removed in filter 125 in accordance with signal fc(n). A further description of variable digital filters may be found in the article by A. V. Oppenheim, W. F. G. Mecklenbrauker and R. M. Mersereau entitled, "Variable Cutoff Linear Phase Digital Filter, " *IEEE Transactions on Circuits and Systems*, Vol. CAS-23, No. 4, pp. 199–203, April 1976.

Alternatively, filter 125 may comprise a bank of discrete filters having spaced cutoff frequencies which span the expected range of the input signal. The discrete filters may be, for example, finite-impulse-response (FIR) devices adapted as is well known in the art. Cutoff frequency signal fc(n) is thus applied to select one of the discrete filters in order to remove a portion of the spectrum of digital input signals s(n).

In particular, it has been found that the expected frequency range of the input signal may be divided into four equal parts. Filter 125 may therefore comprise four discrete filters having cutoff frequencies corresponding to the divided range of the input signal. With only four filters, the corresponding FCADDRESS signals in frequency selector 120 may thereby be two-bit words. Advantageously, two-bit FCADDRESS signals require a comparatively small amount of additional bandwidth for transmission via multiplexer 145 and channels 150 and 155.

The filtered digital samples from filter 125 are applied to D/A (digital-to-analog) converter 130. In converter 130, the filtered digital signals are converted to analog form. Converter 130 may be, for example, a model DAC-HZ-12-BMC circuit made by Datel, Incorporated.

The analog signal from converter 130 is applied to filter 135. Filter 135 may be, for example, a bandpass filter operative to attenuate frequencies below 200 Hz and above 3200 Hz. The filtered analog signal is applied to coder 140. Coder 140 may be, for example, an adaptive delta modulator (ADM), as is well known in the art. Alternatively, coder 140 may be an adaptive differential pulse code modulator (ADPCM), likewise well known in the art.

Digital speech signals SDATA from coder 140 and FCADDRESS signals from frequency selector 120 are applied to multiplexer 145. In multiplexer 145 the SDATA and FCADDRESS signals are interleaved in time for transmission over channel 150. At channel 155 and demultiplexer 160, signals received from channel 150 are reconstructed into signals SDATA' and FCADDRESS'. Channels 150 and 155, and multiplexers 145 and 160 are representative of digital communication systems well known in the art such as the Bell D3/T1 carrier system.

It is to be understood that channels 150 and 155, and multiplexers 145 and 160 may be representative of other systems utilizing digitally coded signals. A digital voice storage system, for example, may incorporate the noise and bit rate reduction arrangement of the present invention.

SDATA' signals from demultiplexer 160 are applied to decoder 165. Decoder 165 may be, for example, an ADM or ADPCM device. In decoder 165, SDATA' signals are converted into an analog replica, s'(t), of the input signal s(t). Replica signal s'(t) is applied to filter 170, which may be, for example, a 200 Hz to 3200 Hz bandpass. The filtered replica signal s'(t) from filter 170 is applied to A/D converter 180. Converter 180 and clock 181 operate in the same manner as previously described with reference to converter 110 and clock 111.

Digital replica signals s'(n) from converter 180 are applied to filter 185. Filter 185 is operative in the manner as previously described with reference to filter 125. Cutoff frequency signals fc'(n) are applied to filter 185 from PROM 175. PROM 175 receives FCADDRESS signals from demultiplexer 160 and is operative to generate signals fc'(n) in the manner as previously described with reference to PROM 250 in FIG. 2.

Filtered digital signals from filter 185 are converted into analog form in D/A converter 190. The analog output signal from converter 190 is applied to filter 195. Filter 195 may be, for example, a 200 Hz to 3200 K Hz bandpass. The filtered analog signal from filter 195 is applied to utilization device 196.

In summary, the preceding apparatus is arranged to reduce coder noise by tracking the bandwidth of the input speech signal. The tracking process may also be applied to reduce the average bit rate of the coder. It will be recalled that the sampling rate of the coder must be at least twice the maximum frequency of the input signal. In accordance with the invention, therefore, the sampling rate of the coder is altered at about twice the cutoff frequency of the input signal filter. The average bit rate of the coder is thereby reduced as compared to prior arrangements in which the coder sampling rate is fixed.

In particular, cutoff frequency address signals FCADDRESS are used to set the sampling rate of coder 140. Similarly, signals FCADDRESS' are used to set the sampling rate of decoder 165. The average bit rate of the SDATA signals is thereby reduced with no loss of quality. Referring to FIG. 2, PROM 250 comprises a cascade of memory circuits providing additional memory locations at a given address, as is well known in the art. Thereby, in addition to cutoff frequency signals fc(n) stored at a given address, clock rate signals CKF are also stored. CKF signals from PROM 250 are applied to the rate input of rate multiplier 255. Rate multiplier 255 may be, for example, a type 7497 circuit made by Texas Instruments, Incorporated. The output of cd clock 256, which may operate at 8 K Hz, for example, is applied to the clock input of rate multiplier 255. Signal CKF is thereby operative to set the frequency of signal CODERCLOCK, which is output from rate multiplier 255.

Referring to FIG. 1, signal CODERCLOCK from the rate multiplier in frequency selector 120 is applied to establish the sampling rate of coder 140. Similarly, the sampling rate of decoder 165 may be altered. PROM 175 comprises a cascade of memory devices, as previously described with respect to PROM 250. Responsive to FCADDRESS' signals from demultiplexer 160, PROM 175 outputs clock rate signals CKF' to rate multiplier 176. The output of cd clock 177 is applied to the clock input of rate multiplier 176. The frequency of signal CODERCLOCK' from rate multiplier 176 is thereby controlled to alter the sampling rate of decoder 165.

While the invention has been shown and described with reference to preferred embodiments, it is to be understood that various modifications may be made by one skilled in the art without departing from the spirit and scope of the invention. For example, in some applications it may be desirable to establish lower limit cutoff frequencies in addition to or as an alternative to the upper limit cutoff frequencies of the present embodiment.

TABLE 1

Normalizer Program

```
SUBROUTINE NORM (X, IF)
DIMENSION X(IF)
REAL X, T, Z, XHAT
INTEGER IF, I
T=0
DO 10 I=1, IF
Z=CABS (X(I))
T=T+Z*Z
CONTINUE
DO 20 I=1, IF
XHAT=X(I)/T
OUTPUT (XHAT)
CALL CLOCK
CONTINUE
CALL RESET
RETURN
END
```

What is claimed is:

1. A method for reducing bandwidth in a digital signal processing system comprising the steps of
    partitioning an input signal into a succession of frames,
    generating signals representative of the spectral energy of the input signal in each frame,
    removing a portion of the input signal spectrum in each frame responsive to the spectral energy signals to form a modified input signal, said removing step comprising, attenuating a portion of the input signal spectrum in each frame corresponding to a predetermined percentage of the total spectral energy in the frame, and
    coding the modified input signal.

2. A method for reducing bandwidth in a digital signal processing system according to claim 1 further comprising the steps of
    decoding the coded signals corresponding to said modified input signal to form a replica of the modified input signal, and
    removing a portion of the replica signal spectrum in each frame correlative to the portion of the input signal spectrum removed in the corresponding frame of the input signal, said removing step comprising attenuating the portion of the replica signal spectrum in each frame correlative to the predetermined percentage of the input signal spectrum attenuated in the corresponding frame of the input signal.

3. A method for reducing bandwidth in a digital signal processing system according to claim 2 wherein
    the coding step comprises sampling the modified input signal at a rate alterable responsive to the spectral energy signals in each frame, and
    the decoding step comprises sampling the coded signals at a rate correlative to the sampling rate of the modified input signal in the corresponding input signal frame.

4. A method for reducing bandwidth in a digital signal processing system according to claim 3 wherein
    the input signal attenuating step comprises generating signals responsive to the spectral energy signals representative of a frequency in each frame above which the predetermined percentage of the total spectral energy in a frame lies, applying the input signal to a first filter, and altering the cutoff frequency of the first filter responsive to the frequency signals in each frame of the input signal; and
    the replica signal attenuating step comprises applying the replica signal to a second filter, and altering the cutoff frequency of the second filter in each frame of the replica signal responsive to the frequency signals in the corresponding frame of the input signal.

5. A method for reducing bandwidth in a digital signal processing system according to claim 4 wherein the frequency signals are representative of the frequency in each frame above which approximately one percent of the total spectral energy in the frame lies.

6. A method for reducing bandwidth in a digital signal processing system according to claims 4 or 5 wherein
    the modified input signal sampling step comprises generating a clock signal for each frame of the input signal at a rate proportionate to the frequency represented by the frequency signals in the frame, applying the filtered input signals from the first filter to a coder, and altering the sampling rate of the coder responsive to the clock signals for each frame of the input signal; and
    the coded signal sampling step comprises applying the coded signals to a decoder, and altering the sampling rate of the decoder in each frame of the replica signal responsive to the clock signal for the corresponding frame of the input signal.

7. A method for reducing bandwidth in a digital signal processing system according to claim 6 wherein the clock signal is generated at twice the frequency represented by the frequency signals in the frame.

8. Apparatus for reducing bandwidth in a digital signal processing system comprising
    means for partitioning an input signal into a succession of frames,
    means for generating signals representative of the spectral energy of the input signal in each frame,
    means for removing in each frame a portion of the input signal spectrum responsive to the spectral energy signals to form a modified input signal, said removing means comprising means for attenuating a portion of the input signal spectrum in each frame corresponding to a predetermined percentage of the total spectral energy in the frame, and
    means for coding the modified input signal.

9. Apparatus as in claim 8 further comprising
    means for decoding the coded signals corresponding to said modified input signal to form a replica of the modified input signal, and
    means for removing in each frame of the replica signal a portion of the replica signal spectrum correlative to the portion of the input signal spectrum removed in the corresponding frame of the input signal, said removing means comprising means for attenuating the portion of the replica signal spectrum in each frame correlative to the predetermined percentage of the input signal spectrum attenuated in the corresponding frame of the input signal.

10. Apparatus as in claim 9 wherein
    the means for coding further comprises means for sampling the modified input signal at a rate alterable responsive to the spectral energy signals in each frame, and the means for decoding further comprises means for sampling the coded signals at a rate correlative to the sampling rate in the corresponding frame of the input signal.

11. Apparatus as in claim 10 wherein the means for attenuating the input signal spectrum comprises means responsive to the spectral energy signals for generating signals representative of a frequency in each frame above which the predetermined percentage of the total spectral energy in a frame lies, and means for filtering the input signal, the cutoff frequency of the input signal filtering means being alterable responsive to the frequency signals in the frame; and the means for attenuating the replica signal spectrum comprises means for filtering the replica signal, the cutoff frequency of the replica signal filtering means being alterable responsive to the frequency signals in the corresponding frame of the input signal.

12. Apparatus as in claim 11 wherein the frequency signals are representative of the frequency in each frame above which approximately one percent of the total spectral energy in the frame lies.

13. Apparatus as in claims 11 or 12 wherein the means for sampling the modified input signal comprises means for generating a clock signal for each frame of the input signal at a rate proportionate to the frequency represented by the frequency signals in the frame, and means for coding the input signal, the sampling rate of the coding means being alterable responsive to the clock signal for each frame of the input signal; and the means for sampling the coded signal comprises means for decoding the coded signal, the sampling rate of the decoding means being alterable responsive to the clock signal for the corresponding frame of the input signal.

14. Apparatus as in claim 13 wherein the clock signal is generated at twice the frequency represented by the frequency signals in the frame.

15. Apparatus for reducing bandwidth in a digital signal processing system comprising means for receiving an input speech signal,
means for bandpass filtering the speech signal,
means for converting the bandpass filtered signal into first digital signals;
means for partitioning the first digital signals into a succession of overlapping frames,
means responsive to the first digital signals for selecting frequency signals representative of a frequency in each frame above which a predetermined percentage of the spectral energy lies in the frame,
means for filtering the first digital signals,
means for altering the cutoff frequency of the first digital signal filtering means responsive to the selected frequency signals in each frame;
means for converting the filtered first digital signals into a first analog signal,
means for bandpass filtering the first analog signal,
means for coding the filtered first analog signal, and
means for multiplexing the coded signals and the selected frequency signals in each frame.

16. Apparatus as in claim 15 further comprising means for demultiplexing the multiplexed signals to form demultiplexed coded signals and demultiplexed selected frequency signals in each frame,
means for decoding the demultiplexed coded signals,
means for bandpass filtering the decoded signals,
means for converting the bandpass filtered decoded signals into second digital signals,
means for filtering the second digital signals,
means for altering the cutoff frequency of the second digital signal filtering means responsive to the demultiplexed selected frequency signals in each frame,
means for converting the filtered second digital signals into a second analog signal, and
means responsive to the second analog signal for outputting a replica of the input speech signal.

17. A method for reducing bandwidth in a digital signal processing system comprising the steps of receiving an input speech signal,
bandpass filtering the speech signal,
converting the bandpass filtered signal into first digital signals;
partitioning the first digital signals into a succession of overlapping frames,
selecting frequency signals responsive to the first digital signals representative of a frequency in each frame above which a predetermined percentage of the spectral energy lies in the frame,
filtering the first digital signals,
altering the cutoff frequency of the first digital signals means responsive to the selected frequency signals in each frame;
converting the filtered first digital signals into a first analog signal,
bandpass filtering the first analog signal,
coding the filtered first analog signal,
multiplexing the coded signals and the selected frequency signals in each frame.

18. A method for reducing bandwidth in a digital signal processing system according to claim 17 further comprising the steps of demultiplexing the multiplexed signals to form demultiplexed coded signals and demultiplexed selected frequency signals in each frame,
decoding the demultiplexed coded signals,
bandpass filtering the decoded signals,
converting the bandpass filtered decoded signals into second digital signals,
filtering the second digital signals,
altering the cutoff frequency of the second digital signals filtering means responsive to the demultiplexed selected frequency signals in each frame,
converting the filtered second digital signals into a second analog signal, and
outputting a replica of the input speech signal responsive to the second analog signal.

* * * * *

UNITED STATES PATENT AND TRADEMARK OFFICE
CERTIFICATE OF CORRECTION

PATENT NO. : 4,417,102

DATED : November 22, 1983

INVENTOR(S) : Jonathan B. Allen

It is certified that error appears in the above-identified patent and that said Letters Patent is hereby corrected as shown below:

Column 4, line 2, "$X_m(f) =$" should read --$\hat{X}_m(f) =$--; line 4, "$\Sigma\ X_m(f)$" should read --$\Sigma\ X_m(f')$--; line 5, "$f=o$" should read --$f'=o$--; line 24, "$X_m(f)$" should read --$\hat{X}_m(f)$--; line 29, "$X_m(f)$" should read --$\hat{X}_m(f)$--; line 31, "$X_m(f)$" should read --$\hat{X}_m(f)$--.

*Signed and Sealed this*

*Seventh* Day of *February 1984*

[SEAL]

*Attest:*

*Attesting Officer*

GERALD J. MOSSINGHOFF

*Commissioner of Patents and Trademarks*